United States Patent [19]

Anderson et al.

[11] Patent Number: 5,008,545
[45] Date of Patent: Apr. 16, 1991

[54] HIGH RESOLUTION OPTICAL FAULT LOCATOR

[75] Inventors: Duwayne R. Anderson; Robert W. McMahon, both of Redmond; Barry L. Rosenow, Bend, all of Oreg.

[73] Assignee: Tektronix, Inc., Beaverton, Oreg.

[21] Appl. No.: 425,770

[22] Filed: Oct. 23, 1989

[51] Int. Cl.$^5$ ............................................. G01N 21/45
[52] U.S. Cl. .................... 250/358.1; 250/341; 556/73.1; 350/73.1; 350/96.15
[58] Field of Search .................... 250/341, 358.1; 356/73.1; 350/96.15, 96.15

[56] References Cited

U.S. PATENT DOCUMENTS

| H668 | 9/1989 | Rand | 350/96.15 |
|---|---|---|---|
| 4,320,968 | 3/1982 | Wakabayashi et al. | 356/73.1 |
| 4,685,799 | 8/1987 | Brininstool | 356/73.1 |
| 4,772,084 | 9/1988 | Bogert | 350/96.15 |
| 4,772,085 | 9/1988 | Moore et al. | 350/96.15 |
| 4,823,166 | 4/1989 | Hartog et al. | 250/227.19 |
| 4,834,481 | 5/1989 | Lawson et al. | 350/96.15 |
| 4,838,690 | 6/1989 | Buckland et al. | 356/73.1 |

Primary Examiner—Carolyn E. Fields
Assistant Examiner—Drew A. Dunn
Attorney, Agent, or Firm—William K. Bucher

[57] ABSTRACT

A high resolution optical fault locator for single mode applications uses a high power, short wavelength laser for generating narrow optical pulses that are launched into a single mode fiber under test. The laser output is coupled to a multimode coupler whose output is coupled to a multimode output fiber. The multimode output fiber is fusion spliced with a single mode fiber, which is coupled to a front panel connector for connecting the fiber under test to the fault locator. An optical detector that is compatible with the output laser is coupled to the multimode coupler to receive the reflected light from the fiber under test. The high resolution fault locator is useful in examining single mode local area networks where many closely spaced fiber connections exist.

5 Claims, 1 Drawing Sheet

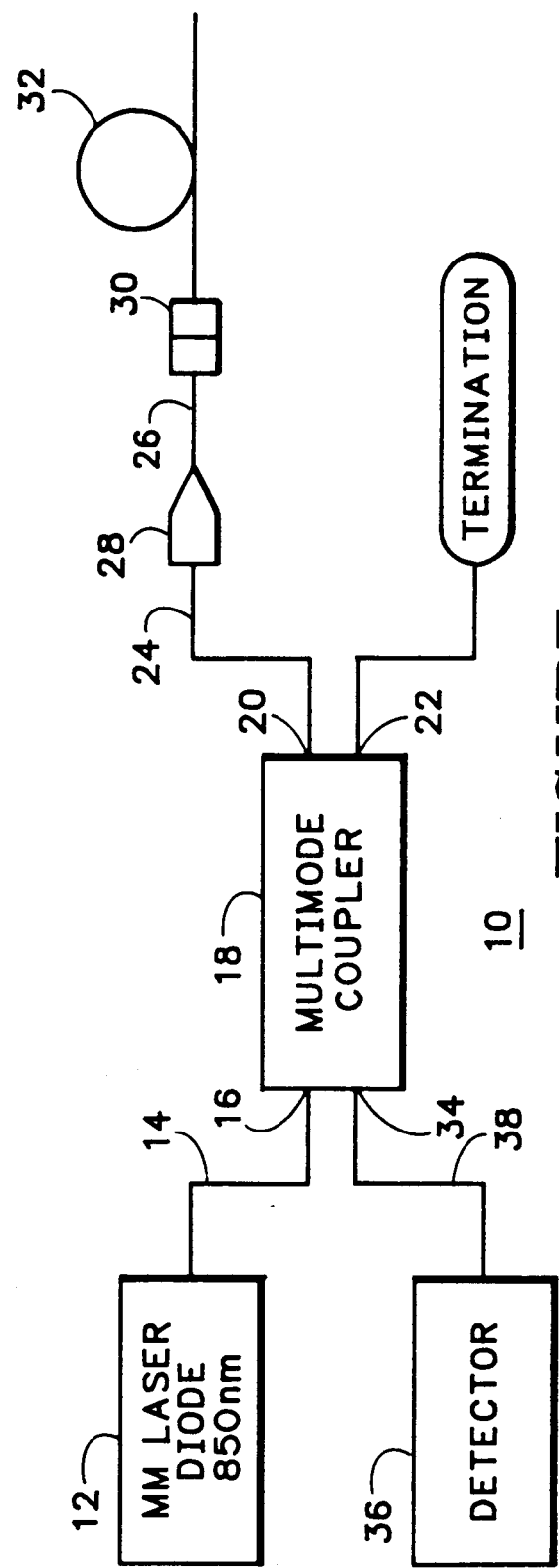

HIGH RESOLUTION OPTICAL FAULT LOCATOR

BACKGROUND OF THE INVENTION

The present invention relates to optical time domain reflectometry and more specifically to high resolution examination of single mode optical fibers using multimode optical pulses.

Optical time domain reflectometers, OTDR, are used in the telecommunications industry for examining fiber optic cables to locate discontinuities or breaks that affect the signal transmission quality through the cable. In examining a fiber with an OTDR, optical pulses generated by a laser are launched into the fiber under test. During the time period between the optical pulse transmissions, light reflected back from the fiber in the form of backscatter and reflections associated with events, such as splices, coupler connections and breaks, is converted to an electrical signal, sampled and stored for display. The stored data is displayed as an amplitude vs time plot showing a gradually decreasing backscatter energy level with reflective events appearing as pulses on the backscatter.

There are two major types of optical telecommunication systems in use today, multimode systems and single mode systems. Each system has specific attributes based on the wavelength of the optical source and the core diameter of the optical fiber used. In a multimode system, short wavelength light in the range of 850nm is generally used. The optical source for the light is either a light emitting diode, LED, or a laser diode. The most commonly used optical fiber has a core diameter of 62.5 microns with other sizes ranging from 50 to 100 microns. A major advantage in 850nm based systems is the lower cost of components compared to single mode systems. However, signal attenuation is wavelength dependent so the transmission range of 850nm multimode systems is limited. This is also true for a single mode system operating with a 850nm optical source. Another factor affecting multimode systems is the dispersion effects on data transmission bandwidths over distance. As the transmission distance increases in a multimode system, the data bandwidth decreases.

Single mode transmission systems are used where greater transmission range and data transmission bandwidths are required. The transmission range in single mode systems is on the order of tens of kilometers and the data transmission bandwidth is currently in the range of several gigahertz. In a single mode transmission system, the core diameter of the fiber is approximately 9 microns. Longer wavelength optical sources that are less affected by fiber attenuation are used. The two most commonly used optical sources are laser diodes operating at 1310nm or 1550nm.

Due to wavelength dependent attenuation in the fiber and different core diameters used in the various optical telecommunication systems, electronic test and measurement equipment manufactures produce OTDR's specifically designed for testing each type of optical transmission system. An example of a multimode OTDR is the OF150, manufactured by Tektronix, Inc., Beaverton, Or., USA, and the assignee of the present invention. The OF150 uses a 850nm laser to generate optical pulses that are coupled through a multimode coupler to a front panel connector via multimode optical fibers. The front panel connector accepts 62.5 micron fiber for testing. Reflected light from the fiber under test is coupled to a silicon detector, which converts the optical signal to an electrical signal for further processing by the instrument. An example of a single mode OTDR is the OF235, manufactured by Tektronix, Inc. In the OF235, 1300nm and 1550nm lasers are provided for testing single mode transmission systems at either wavelength. Optical power is coupled through a single mode coupler to a front panel connector via single mode optical fiber. The front panel connector accepts a 9 micron fiber for testing. Reflected light from the fiber under test is coupled to a germanium detector, which converts the optical signal to an electrical signal for further processing by the instrument.

Multimode OTDR's are not capable of accurately testing single mode optical transmission systems. Significant signal loss occurs when trying to couple a single mode fiber to a multimode connector due to the core diameter difference of the respective fibers. This substantially reduces the dynamic range of the instrument. In addition, a significant signal reflection occurs at the interface between the fibers. Further, most event of interest are wavelength sensitive, so that losses at 850nm are different from those at 1310nm and 1550nm. The signal loss is mode dependent, so some fiber features are attenuated more than others.

OTDR's designed for single mode applications have their own drawbacks. The germanium optical detectors used with longer wavelengths of light have a longer detector tail caused by detector storage effects than silicon detector used in OTDR's operating with 850nm optical sources. The detector tail limits the ability of the OTDR to resolve events, such as reflections, that are close together. In addition, to obtain sufficient dynamic range in single mode applications at 1310nm or 1550nm wavelengths, relatively long pulse widths of light are used. This again reduces the resolution of single mode instruments using these wavelengths to detect events that are close together.

What is needed is an instrument for testing single mode optical transmission systems that provides high resolution for detecting events that are close together.

SUMMARY OF THE INVENTION

Accordingly, the present invention is an optical fault locator for single mode fiber examination having a high power, short wavelength optical source, such as an 850nm laser diode, that generates optical power in the form of narrow optical pulses to a single mode fiber under test. A multimode coupler couples the output power from the optical source to a multimode output fiber. A single mode fiber is spliced to the multimode output fiber to couple the optical power from the optical source to the fiber under test via a front panel connector on the optical fault locator. An optical detector that is compatible with the high power, short wavelength optical source is coupled to the multimode coupler to receive reflected light from the fiber under test.

The objects, advantages and novel features of the present invention are apparent from the following appended claims and attached drawings.

BRIEF DESCRIPTION OF THE DRAWING

The figure shows the high resolution optical fault locator of the present invention.

DESCRIPTION OF THE PREFERRED EMBODIMENT

The high resolution optical fault locator of the present invention is designed for examining single mode optical fibers in short range telecommunication systems, such as local area networks where fiber connectors are closely spaced. In order to detect the various connections in the network, it is important that the test equipment be able to resolve closely spaced connections. Referring to the figure, there is shown an optical deck 10 meeting the above requirements having a high power, short wavelength optical source 12 coupled by a multimode optical fiber 14 to an input port 16 of a multimode optical coupler 18. The multimode optical coupler 18 has first and second transmission output ports, respectively numbered 20 and 22. Output port 22 is terminated to reduce reflections while output port 20 is coupled to a multimode output optical fiber 24. Multimode output fiber 24 is coupled to a single mode fiber 26 via a fusion splice 28 producing a low reflectance interface. The single mode fiber 26 is coupled to a front panel connector 30 that accepts a single mode fiber to be tested 32. Reflected light from the fiber under test 32 is coupled through the single mode fiber 26 and the output multimode fiber 24 to the multimode coupler 18. The multimode coupler 18 directs the reflected light to port 34 that is coupled to an optical detector 36 via multimode fiber 38. The optical detector 38 converts the reflected light to electrical energy that is processed by the fault locator for determining the location of events in the fiber 32.

The optical source 12 is a narrow wavelength, high output device, such as a laser diode generating light at a wavelength of 850nm. The 850nm laser 12 generates high power optical pulses in the range of several watts of peak power. The optical power from the laser 12 is coupled to the input port 16 of multimode coupler 18 via the multimode fiber 14. The multimode coupler is a fused biconic device that is designed to equally divide the optical power of each of the propagating modes in the device and couple the equally divided modes to the output ports 20 and 22. The basic manufacturing process for the fused biconic multimode coupler is described in U.S. Pat. No. 4,772,085, assigned to Gould, Inc., Rolling Meadows, Ill., USA, and herein incorporated by reference. To produce the multimode coupler having the above described characteristics, optical power from a single mode fiber is launched into the coupler during the drawing process of the device and the output coupling ratio is monitored at the output ports. The drawing process continues until a fifty percent coupling ratio is reached, whereupon the process is terminated. The optical power input to the coupler in this process is from an 850nm source that is coupled through a 9 micron optical fiber to the coupler. Inputting 850nm wavelength light into a 9 micron fiber produces a bimodal input to the coupler. Using a 1310nm optical source with a 9 micron fiber produces a single mode input.

The multimode output at port 20 is coupled into the multimode fiber 24. Multimode fiber 24 is connected to the single mode fiber 26 by the fusion splice 28. The fusion splice 28 eliminates the large reflection that would occur if the fiber 24 and 26 were directly connected together. Excess light that is not coupled into the single mode fiber 26 from multimode output fiber 24 is dissipated in the cladding of the single mode fiber 26.

Due to the high power level of the multimode laser 12, sufficient optical power is launched into the single mode fiber 26 from the multimode output fiber 24 even though the coupling efficiency is poor. The optical power coupled into the single mode fiber 26 is coupled to the fiber under test via the front panel connector 30.

The light reflected from the fiber under test 32 is coupled through the single mode fiber 26, the fusion splice 28 and the multimode output fiber 24 to the multimode coupler 18. The multimode coupler 18 directs the light to port 34, which is coupled to the optical detector 36 via multimode fiber 38. The optical detector 36 is a silicon type device that is compatible with the 850nm wavelength light generated by laser 12. Some of the advantages of using an 850nm optical source to examine single mode fibers are found with the detector 36. Silicon detectors can be used with higher multiplication gains when operated as avalanche photo detectors as in the present invention. This increases the dynamic range of the optical fault locator. In addition, the storage effects of silicon detectors are less than the storage effects of single mode detectors, producing a smaller detector tail on the trailing edge of reflection pulses associated with events thus increasing the event resolution of the instrument.

The use of a single mode optical coupler at 850nm cannot produce the advantages described for the present invention. The core diameter of fiber in a single mode coupler at 850nm is 6 microns and the core diameter of single mode fiber optimized for 1310nm wavelength light is approximately 9 microns. The output of the 850nm laser is coupled through 6 micron fibers and the 6 micron single mode coupler to a front panel connector that accepts a 9 micron fiber for testing. Any light reflected back by the 9 micron fiber under test suffers a light transference loss of three to four decibel in going from the 9 micron fiber to the 6 micron fiber. This loss substantially reduces the dynamic range of a test instrument implementing this design.

An optical fault locator has been described for examining single mode optical fiber that uses a 850nm laser for launching high power optical pulses into a single mode fiber under test. A multimode optical coupler is used that equally divides the power of individual propagating modes and couples a portion of the power into a multimode output fiber. The output fiber is fusion spliced to a single mode fiber that is connected to the fiber under test via a front panel connector. The reflected light from the single mode fiber is coupled through the fusion splice and the output fiber to the multimode coupler, which directs the light to an optical detector that is compatible with the 850nm laser. Sufficient dynamic range is maintained while at the same time providing a capability for resolving closely spaced events on the fiber. These and other aspects of the present invention are set forth in the appended claims.

We claim:

1. An optical fault locator for examining a single mode optical fiber under test wherein optical pulses are input into the single mode optical fiber under test and a return optical signal is received from the single mode optical fiber under test, the optical fault locator comprising:

a high power, short wavelength optical power source for generating the optical pulses;

an optical detector compatible with the high power, short wavelength optical power source for receiving the return optical signal from the single mode optical fiber under test;

a multimode optical coupler having input ports and output ports with each input port having associated multiple output ports, the optical pulses from the optical power source being received at a first input port and coupled to an output multimode optical fiber connected to one of the output ports associated with the first input port and the return optical signal being received at a second input port and coupled to the optical detector connected to one of the output ports associated with the second input port, the multimode optical coupler equally dividing the optical power of each propagating mode from the optical source and the return optical signal between the associated output ports of the input ports; and a single mode optical fiber spliced to the output multimode optical fiber, the single mode fiber having a connector for coupling the single mode optical fiber under test to the optical fault locator.

2. The optical fault locator of claim 1 wherein the high power, short wavelength optical power source is a laser diode having a optical output in the range of 850 nanometers.

3. The optical fault locator of claim 1 wherein optical detector is silicon device having a reduced storage effect producing a small detector tail.

4. In a multimode optical fiber coupler having input ports and output ports with each input port having multiple output ports and a coupling region formed by tapering and fusing of first and second multimode fibers along a longitudinal section where cladding is removed from the fibers and the longitudinal sections are in parallel juxtaposition, an improved method of manufacturing the multimode optical fiber coupler for producing a multimode optical fiber coupler that equally divides optical power from propagating modes received at one of the input ports between the associated output ports comprising the steps of:

launching optical power from a short wavelength optical power source into one of the input ports of the multimode fiber optic coupler via a single mode optical fiber that propagates lowest order optical modes into the multimode fiber optic coupler;

monitoring the optical power from the output ports associated with the input port for an approximately fifty percent coupling ratio while forming the coupling region; and terminating the formation of the coupling region at the approximate fifty percent coupling ratio.

5. The method of manufacturing a multimode fiber optic coupler of claim 4 wherein the launching step further comprises the step of generating an optic power output having a wavelength of 850 nanometers and coupling the optical power output into the single mode optical fiber propagating at least one optical mode.

* * * * *